(12) United States Patent
Kaiser

(10) Patent No.: US 6,234,045 B1
(45) Date of Patent: May 22, 2001

(54) ACTIVE TREMOR CONTROL

(75) Inventor: Kenneth W. Kaiser, North Reading, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/260,685

(22) Filed: Mar. 2, 1999

(51) Int. Cl.[7] ............................................. F16F 15/00
(52) U.S. Cl. ..................................................... 74/574
(58) Field of Search ................................. 74/574, 573 R

(56) References Cited

U.S. PATENT DOCUMENTS

| | | | |
|---|---|---|---|
| 5,291,975 | * 3/1994 | Johnson et al. | 74/574 X |
| 5,553,514 | * 9/1996 | Walkowc | 74/574 |
| 5,809,843 | * 9/1998 | Barger et al. | 74/574 |

FOREIGN PATENT DOCUMENTS

| | | | |
|---|---|---|---|
| 2706559 | * 12/1994 | (FR) | 74/574 |
| 3-168442 | * 7/1991 | (JP) | 74/574 |

* cited by examiner

*Primary Examiner*—Mary Ann Green
(74) *Attorney, Agent, or Firm*—Iandiorio & Teska

(57) ABSTRACT

An active tremor control system for stabilizing against alternating perturbations includes: an inertial sensor for sensing angular motion about a first axis of an object induced by alternating perturbations; an inertial mass independent of the object; and an actuator coupled to the object and the mass and responsive to the inertial sensor for selectively applying a torque to the object representative of the sensed angular motion such that the angular motion about the first axis induced by the perturbation is cancelled, the actuator concurrently applying a reactive torque, equal and opposite to the to the applied torque, to the mass.

17 Claims, 17 Drawing Sheets

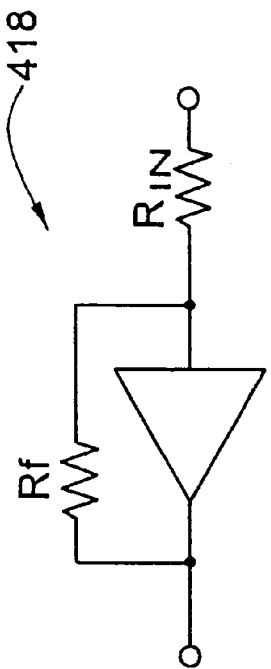
FIG. 6A
FIG. 6B
FIG. 6C

ACTIVE TREMOR CONTROL

FIELD OF INVENTION

This invention relates to stabilization systems, and more particularly to a tremor control system for stabilizing an object from prolonged alternating perturbations.

BACKGROUND OF INVENTION

Human tremor is an involuntary trembling or shaking of the muscles of the body associated with physical weakness, emotional stress, or excitement. Tremor can detrimentally affect task performance for a number of different tasks including microsurgery, marksmanship, photography, videotaping and microcircuit assembly as well as the simple use of a pen by a person afflicted with mild Parkinson's disease.

As an example, surgeons are often required to perform surgery on patients in areas which are very delicate and leave little or no room for error. One such example is eye surgery. A surgeon performing surgery on the eye by cutting the eye with a laser or a scalpel must be very accurate, as a cut which is too deep, or in the wrong position, due to tremor of the surgeon's hand, can be disastrous.

Another example is a marksman such as a military or law enforcement sniper. Such individuals must often make tremendously accurate shots in a split second in order to save the lives of others. However, human tremor resulting from the stress and excitement of the situation as well as the physical fatigue resulting from supporting the weapon for extended periods of time while waiting for the opportunity to make a shot can take its toll on a shooter so that when the time arrives to make the shot, the shot misses its mark. A missed opportunity, whether missing the target completely or merely wounding the target, can further endanger the lives of others.

One technique for compensating for human tremor in such a situation is to fire the weapon, via a computer, as the target moves through the cross hairs. However, this takes the "trigger" away from the shooter, and thus the weapon may fire too early or too late. Moreover, this technique does not solve the problem, but only masks it. The weapon still moves due to the tremor and no stabilization is provided.

One open loop system intended to compensate for jitter due to human tremor is provided for binoculars. This open loop system includes a deformable prism or a steering prism and mechanism which, in response to tremor, deforms the prism, or steers the prism, to maintain a constant line of sight. Thus, as the binoculars move down due to the tremor, the prism optical axis is displaced upward such that the line of sight remains constant. This system, however, only compensates for the jitter of the binoculars and does not counter or eliminate the jitter induced by the person holding the binoculars. While the image does not appear to be moving, the binoculars continue to move. Only the line of sight is stabilized.

Open loop stabilization systems do exist for large scale bodies to eliminate disturbances such as movement over the ocean. This is done using a brute force approach to resist all movement. An enormous gyroscopic wheel is provided, for example under the floor of a sea going vessel, which spins continuously up to such a great speed that all rotation of the floor is resisted. This system however, would not be practical for a surgeon or a sniper. First, the gyroscopic wheel required would be too big compared to the rifle or the scalpel. Second, this type of system resists all movement, especially rapid movement which is necessarily what a surgeon or sniper may encounter, such as when the surgeon moves the scalpel across the patient, or the sniper moves to acquire a second target or follows a primary target.

Another open loop system stabilizes a gun, for example the gun on a tank, with respect to a platform, such as the tank body or the ground, as the tank moves across the terrain. The gun moves with respect to the tank, the jitter of the gun is sensed, and actuators push on the tank (platform) to offset movement of the barrel.

Yet another system intended to stabilize photography equipment uses gyroscopic wheels in opposing axes which spin continuously at 22,000 revolution's per minute to resist both pitch and yaw. However, this system requires an inverter or 400 cycle power access to run the device. Such power requirements prevent long range use in the field such as for a military or law enforcement sniper. Additionally, it takes 5 to 7 minutes before the required operating speed is attained. This system is thus hardly practical when the application is a sniper who must make quick and often optimistic shots. Moreover, because the system operates at a constant 22,000 revolution's per minute to resist any movement, it does not allow for rapid movement of the system which would be required by a sniper when the sniper must track a target or quickly acquire a second target.

The open loop systems discussed above stabilize a body with respect to a platform. However, there are systems which do not have such a platform to push against. For example, satellites in space use a closed loop, active attitude control system to maintain the satellite antenna in a constant orientation with respect to earth in order to maintain communications. This is accomplished using gyroscopic wheels which continuously spin faster and faster to provide a constant, 15 degree per hour rate of angular velocity as the satellite moves with respect to the earth. The motors, rather than pushing on a platform, push on a mass so that, due to conservation of momentum, the satellite will turn. However, that system only provides for the proper attitude of the satellite antenna with respect to a receiving station on earth and does not eliminate jitter of the satellite in response to any external disturbances.

SUMMARY OF INVENTION

It is therefore an object of this invention to provide an active tremor control system which is light weight and compact.

It is a further object of the present invention to provide such a tremor control system which may be easily and efficiently transported by the operator.

It is a further object of the present invention to provide such a tremor control system which is only active when the device experiences tremor induced movement.

It is a further object of the present invention to provide such a tremor control system which stabilizes the device by counteracting only the tremor encountered by the device.

It is a further object of the present invention to provide such a tremor control system which does not rely on external forces to stabilize the device.

It is a further object of the present invention to provide such a tremor control system which is self contained.

It is a further object of the present invention to provide such a tremor control system which is easily adaptable to different applications.

The invention results from the realization that a truly compact, light weight and effective tremor control system for stabilizing a device subject to tremor, including alternating perturbations, can be achieved by sensing the perturbations about at least one axis of the device and selectively and momentarily generating, in response to the sensed perturbations, a force equal to the perturbation and applying that force to the device whereby the perturbation is cancelled, and concurrently applying a reactive force, equal and opposite to the applied force to an independent mass coupled to the device.

This invention features an active tremor control system for stabilizing an object against alternating perturbations. There is an inertial sensor for sensing angular motion about a first axis of the object induced by the alternating perturbations and an inertial mass independent of the object. An actuator, coupled to the object and the mass and responsive to the object and the inertial sensor, selectively applies a torque to the object representative of the sensed angular motion such that the angular motion about the first axis induced by the perturbation is cancelled. The actuator concurrently applies a reactive torque, equal and opposite to the applied torque, to the mass.

In a preferred embodiment the inertial sensor may be a rate gyroscope for measuring the angular rotation about the axis. The inertial sensor may be an accelerometer. The accelerometer may be an angular accelerometer. The inertial mass may be a wheel. The actuator may be a rotational motor. The inertial mass may be a rod. The actuator may be a torque motor. The inertial mass may be a tube. The actuator may be a linear motor. The actuator may be a piezoelectric device. There may be a second inertial sensor for sensing angular motion about a second axis of the object due to the alternating perturbations and a second actuator, coupled to the object and the mass and responsive to the second inertial sensor, to selectively apply a torque to the object representative of the sensed angular motion such that the angular motion about the second axis induced by the perturbation is cancelled. The second actuator concurrently applies a reactive torque, equal and opposite to the applied torque, to the mass. The object may be a firearm, a camera, a scalpel or a writing implement.

The invention also features an active tremor control system for stabilizing an object against alternating perturbations having a first inertial sensor for sensing angular motion about a first axis of an object due to alternating perturbations and a second inertial sensor for sensing angular motion about a second axis of the object due the alternating perturbations. There are at least first and second inertial masses. There is a first actuator coupled to the object and the first mass and responsive to the first inertial sensor, to selectively apply a torque to the object representative of the sensed angular motion about the first axis. The first actuator concurrently applies a first reactive torque, in response to the first applied torque, to the first inertial mass, equal and opposite to the first applied torque, such that the angular motion about the first axis is cancelled. There is a second actuator coupled to the object and the second mass and responsive to the second inertial sensor, to selectively apply a second torque to the object representative of the sensed angular motion about the second axis. The second actuator concurrently applies a second reactive torque, in response to the second applied torque, to the second mass, equal and opposite to the second applied torque, such that the angular motion about the second axis is cancelled.

DISCLOSURE OF PREFERRED EMBODIMENT

Other objects, features and advantages will occur to those skilled in the art from the following description of a preferred embodiment and the accompanying drawings, in which:

FIG. 6A is a schematic diagram of a compensator consisting of a proportional, integral and derivative circuit;

FIG. 6B is a a schematic diagram of a compensator consisting of a proportional and integral circuit;

FIG. 6C is a schematic diagram of a compensator consisting of a proportional circuit;

Figure 1:
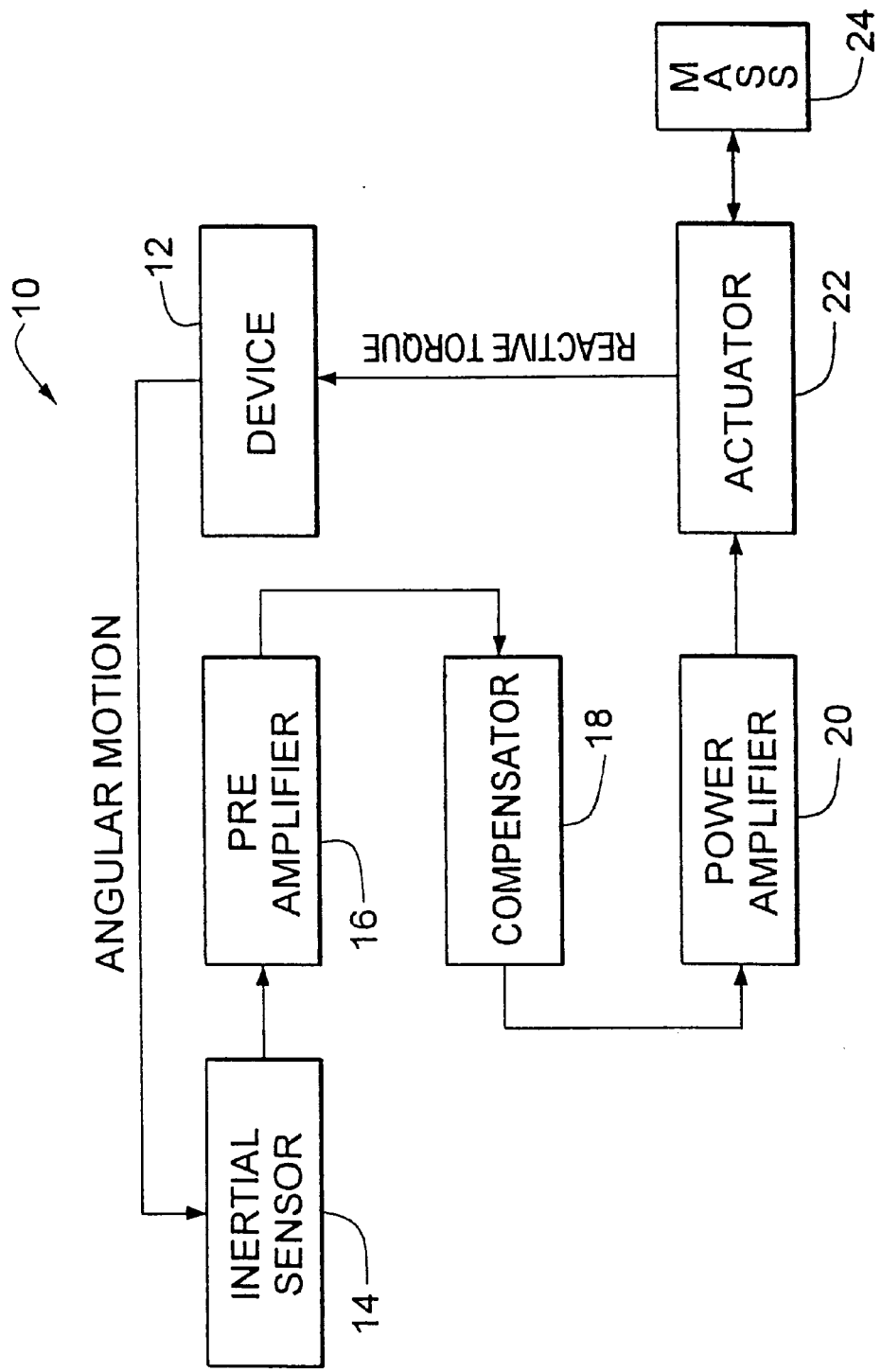
FIG. 1 is a block diagram of the closed loop tremor control system according to the present invention.

Active tremor control system 10, FIG. 1, provides stabilization of a device subject to alternating perturbations, such as those experienced with human tremor. Device 12 may be any hand held device, for example, a firearm, camera, scalpel, or writing implement. Device 12 is fitted with at least one inertial sensor 14 which senses motion about at least one control axis. This is not a necessary limitation of the invention, however, as additional sensors may be used depending on the number of degrees of movement to be monitored, e.g. pitch, yaw, or roll, or a single sensor may be used which senses motion about multiple axes.

Inertial sensor 14 detects angular motion about the control axis and sends a signal representative of the detected motion to preamplifier 16 which conditions and amplifies the signal. The conditioned signal is sent to compensator 18 which, in response, generates a reaction signal which is amplified by power amplifier 20 and then applied to actuator 22 coupled to device 12. Actuator 22, in response to the reaction signal, generates a torque equal and opposite to the sensed angular motion and applies the torque to device 12. However, actuator 22 must simultaneously apply a reactive torque to independent mass 24, thereby allowing actuator 22 to "push" on mass 24 such that the angular motion about the control axis caused by the tremor is cancelled.

Thus, the closed loop system of the present invention satisfies Newton's third law of reaction force. The system quickly and effectively cancels the disturbance sensed by "pushing" on the mass, thereby allowing the torque applied to the device to cancel the alternating perturbations induced by tremor. This system, unlike the prior art, is a closed loop system which physically counteracts the disturbance rather than merely compensating for it.

Moreover, the system of the present invention counters only the disturbance sensed, unlike prior systems which address the problem with a brute force approach by resisting all motion.

Figure 2:
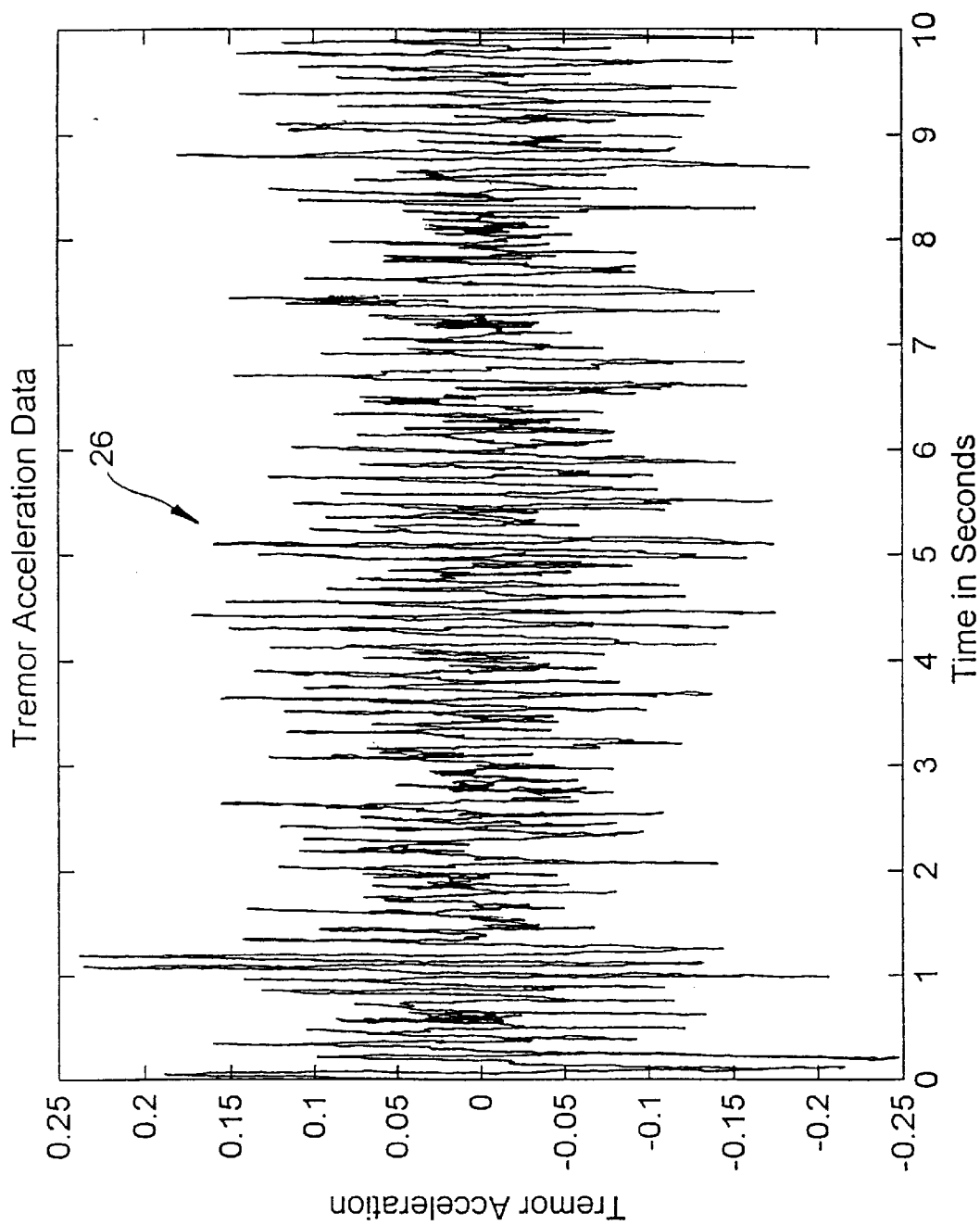
FIG. 2 is a representation of the tremor associated with a human finger under no load.

Waveform 26, FIG. 2, represents the normal tremor encountered by a pointed finger over a ten (10) second period of time with no load. Where the individual is afflicted with mild Parkinson's disease, the tremor acceleration is even greater. The tremor is exacerbated where an object is being held and the individual is subject to further perturbation such as that from an automobile or aircraft, for example, an helicopter, as will be further discussed below.

Figure 3:
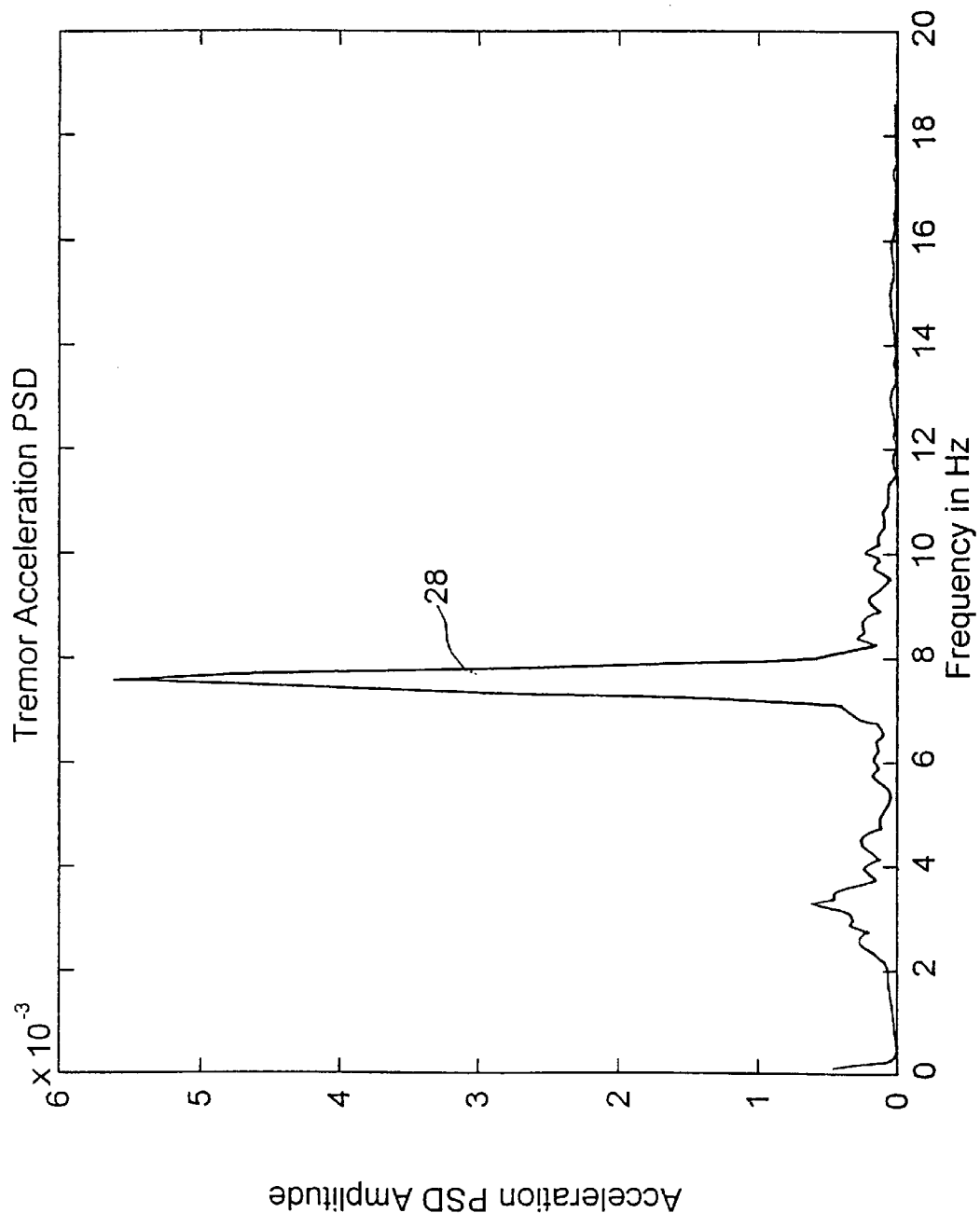
FIG. 3 is a representation of the spectral density of the tremor of FIG. 2.

The frequency range typically associated with normal human tremor is demonstrated by waveform 28, FIG. 3, which represents the frequency density of waveform 26, FIG. 2. As waveform 28 demonstrates, the frequency range varies from approximately two (2) hertz to fifteen (15) hertz. However, most of the disturbance lies with the seven (7) hertz–eight (8) hertz range.

Figure 4:
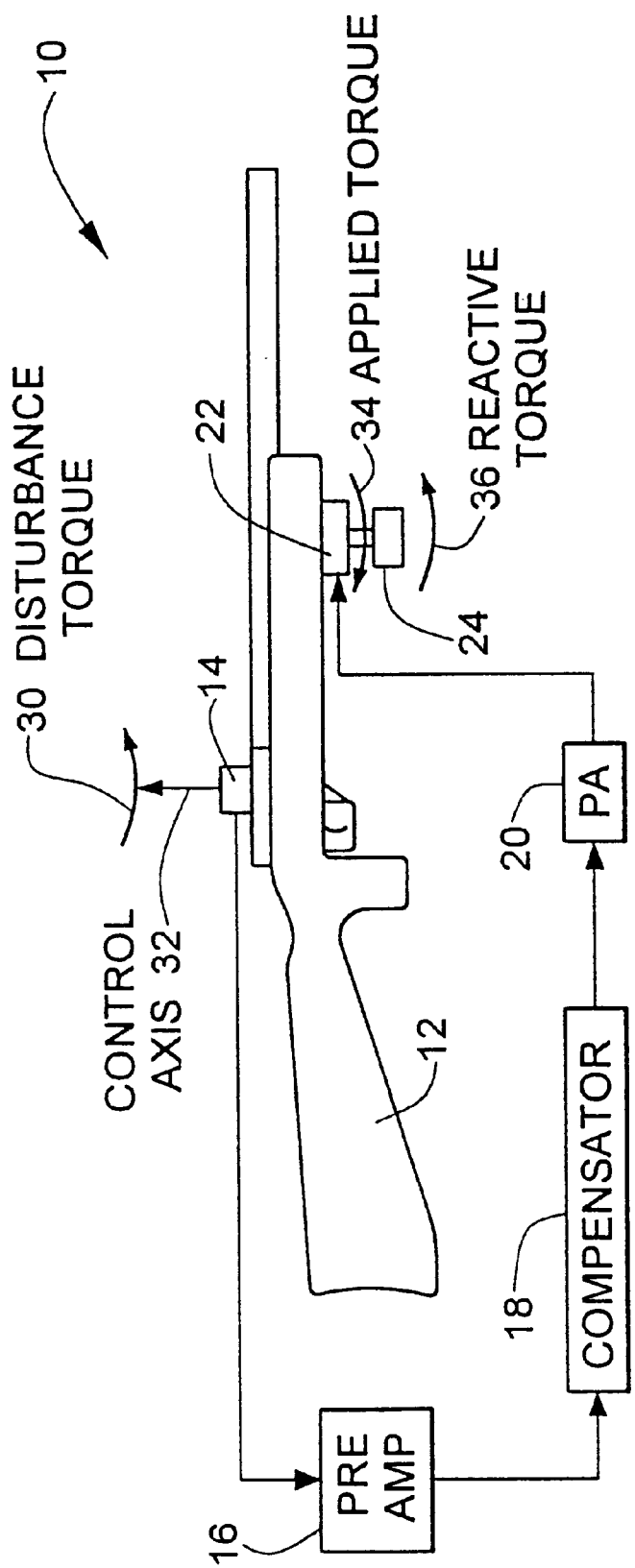
FIG. 4 is a schematic block diagram of the tremor control system according the present invention applied to a firearm demonstrating how a motor applies a torque to the firearm, equal and opposite to the tremor sensed, and simultaneously applies a reactive torque to a mass to cancel the sensed tremor.

Thus, the system according to the present invention does not require a mass proportional to the mass of the device, but only requires a mass proportional to the frequency range of interest. Accordingly, where the system is incorporated into the rifle of an experienced marksman who is sufficiently skilled such that the tremor is minimal, the mass may be very small due to the limited tremor to be cancelled. In contrast, where the marksman is less experienced, the mass may be larger to counter the larger tremor of the inexperienced shooter. Finally, where the marksman is in a vehicle, for example a boat or helicopter, and thus subject to additional perturbations greater than the marksman's normal tremor, the mass may be much larger in order to counter both the perturbations due to human tremor and the perturbations induced by the motion of the helicopter, which may be in the frequency range of 17–18 hertz for an helicopter experiencing a vertical acceleration of 0.22 g's at a frequency of 1032 revolutions per minute. While it is difficult to ascertain the amplitude of the vibration induced tremor, it is reasonable to say that the amplitude is orders of magnitude above normal human tremor Active tremor control system 10, FIG. 4, may thus be incorporated into a rifle to improve marksmanship. Inertial sensor 14 may be mounted on rifle 12 to sense angular motion about axis 32, for example yaw. To counter induced pitch and roll, additional sensors may be mounted in respective axes, or a single sensor which is capable of sensing motion in multiple degrees may be used.

Inertial sensor 14 senses angular motion 30 about axis 32 and sends a signal representative of the angular motion to preamplifier 16 which performs signal conditioning and amplification to provide a reliable output signal. The amplified signal is manipulated by compensator 18 which generates a reaction signal. Compensator 18 produces high gain over the frequency of the tremor, typically 2–15 hertz, while eliminating gain at high frequencies in order to provide closed loop system stability. The reaction signal is amplified by power amplifier 20 to provide a signal representative the sensed angular motion that drives actuator 22, which may be, for example, a motor, to generate torque 34, equal and opposite to torque 30, which is applied to rifle 12.

However, because the device is free floating, that is, unsupported in any plane, for system 10 to effectively cancel the induced angular motion 30, applied torque 34 must "push" on something. Accordingly, actuator 22 is also coupled to independent mass 24 and simultaneously applies reactive torque 36 to mass 24. Thus, by applying reactive torque 36 equal to the sensed angular motion 30 to mass 24, applied torque 34 physically cancels the sensed tremor.

Figure 5:
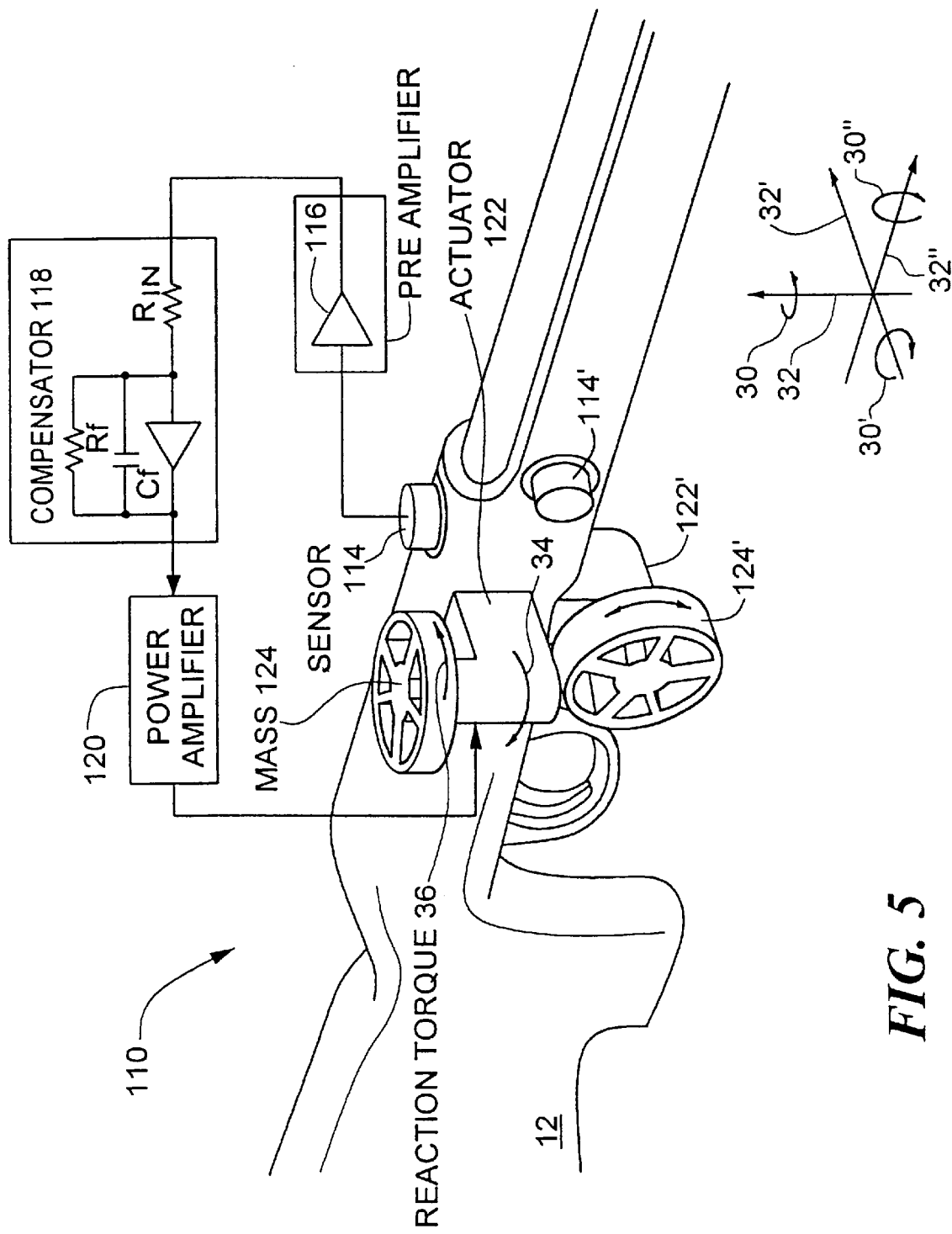
FIG. 5 is a three-dimensional view of the tremor control system of the present invention mounted on a rifle in which an inertial sensor senses pitch and an inertial wheel cancels the pitch while another inertial sensor senses yaw and an inertial wheel cancels the yaw.

Operation of the system is demonstrated by active tremor control system 110, FIG. 5, in which inertial sensor 114, for example a rate gyroscope, senses angular motion 30 about axis 32 to detect yaw. The inertial sensor may be, for example, a micromechanical gyro Model TFG-14 available from Draper Laboratory, Cambridge, Mass. where the user is an experienced marksman. However, where the frequency to be countered is that induced by a less experienced shooter the gyro may be a Quartz Rate Sensor, Model QRS11-00010-101 high performance low noise low rate unit, available from Systron Donner, Concord, Calif. Finally, where the marksman may be in an helicopter, an appropriate gyro may be a QRS11-00050-100 higher rate capability model, also available from Systron Donner.

Compensator 118, for example shown here as a lag compensator, performs control loop gain shaping in the frequency domain to reject disturbances in the desired frequency range and maintain a stable closed loop by amplifying only over the bandwidth of the tremor, typically 0.2–15 hertz. The transfer function of the lag compensator may be represented by $$\frac{K}{1 + \tau S} \qquad 1$$

where K is the DC gain, $\tau$ is the lag compensator time constant and S is the laplace transform variable. Thus, a lag compensator provides good compensation for perturbations under most circumstances.

The lag is determined by:

$$\tau = \frac{1}{2\pi f_c}$$

where $f_c$ is the low frequency control loop cut off frequency. The value of $f_c$ is chosen to both suitably attenuate the human tremor and maintain phase margin so that the closed loop is stable. As an example, a value of $f_c$=15 to 30 Hz would provide high gain over the 0.2 to 15 hertz range of human tremor and low gain at high frequencies where the control loop phase is 180 degrees.

$R_{IN}$ and $R_f$ may be adjusted to accommodate different ranges of tremor, for example, marksmen of varying skill, as well as to accommodate additional disturbances such as the helicopter discussed above, by increasing the bandwidth. $R_{IN}$ may be adjusted to accommodate a larger disturbance amplitude, such as the inexperienced human operator as compared to an experienced human operator. Similarly, $R_f$ may be adjusted to accommodate a larger disturbance bandwidth, such as human tremor in a range of 0.2 –15 Hz as compared to a helicopter disturbance.

$R_f$ may also be adjusted to widen the bandwidth in order to allow the marksman to track a target, provided the target is tracked sufficiently slow. Thus, the system may be designed to counter a predetermined amount of intentional voluntary motion. This is achieved by keeping the voluntary motion below 0.1–17 Hz in frequency content. The lower limit of 0.1 Hz can be adjusted upwards if required to suitably accommodate the intentional motion. For example, in the case of sniper tracking a target, the normal hand tremor is 0.1–17 Hz in frequency content. The voluntary motion is 0–0.1 Hz in frequency content. Thus, the compensator would be designed to pass frequencies in the range of 0–0.1 Hz and attenuate frequencies in the 0.2–17 Hz range. Accordingly, if the target is tracked too fast the angular motion detected will be greater than that which the system is designed to cancel. Thus, the system may be readily adjusted to accommodate a variety of situations and circumstances.

Compensator 118 provides the reaction signal to power amplifier 120 which ultimately drives actuator 122 which may be, for example, a dc server motor. Actuator 122 is also selected based on the system requirements, e.g. the experienced marksman versus the inexperienced marksman, because actuator 122 applies torque 34 to rifle 12 which is equal and opposite to an anticipated range of perturbation due to tremor. However, as discussed above, in order to cancel angular motion 30, actuator 122 must push on something, and thus actuator 122 applies reactive torque 36 to inertial mass 124, which may be, for example, a wheel, in order to effectively cancel angular motion 30 about axis 32. In this manner, the device obeys Newton's third law of reaction torque. The wheel of mass 124 will, as with actuator 122 and compensator 118, vary depending on the user. Thus, the experienced marksman may have wheels that are smaller, for example a wheel that has a moment of inertia that is on the order of 0.1% to 0.3% that of the moment of inertia of the rifle, that is, a moment of inertia of 0.0021 (inch pound second$^2$), while the inexperienced marksman will require wheels which are larger, for example wheels that have a moment of inertia that is 0.3% to 0.5% that of the moment of inertia of the rifle in order, for example 0.004 (inch pound second$^2$) in order to provide stabilization over a larger range of disturbance. Similarly, the marksman in an helicopter will require even larger wheels to cancel the additional perturbation induced by the helicopter. Thus, the active tremor control system of the present invention can be adjusted to accommodate a variety of circumstances by varying the different components.

As will be understood by those skilled in the art, disturbances in pitch are cancelled in the same manner as discussed above by placing additional sensor 114', actuator 122' and inertial mass 124' on rifle 12 to cancel angular motion 30' about axis 32'.

Compensator 218, FIG. 6A, may alternatively include a proportional, integral and derivative (PID) circuit. The transfer function for the PID compensator is represented by:

$$\frac{K_i}{S} + K_p + K_d S \qquad 3$$

Where S is the Laplace transform variable and $K_i$ is the gain of the integrator, $K_p$ is the proportional gain, and $K_d$ is the derivative gain. The primary function of the integrator is to attenuate low frequency disturbances. The primary function of the proportional gain is stabilize the control loop and attenuate the mid range frequencies. The primary function of the derivative action is to provide control loop stability if the frequency range of disturbances is extended, as for example in a helicopter.

However, where fewer disturbances are to be rejected, such as with an experienced marksman, compensator 318, FIG. 6B, may include a PI circuit, wherein $C_{IN}$ is eliminated from compensator 218, FIG. 6A, yielding the transfer function:

$$\frac{K_i}{S} + K_p \qquad 4$$

However, the circuit may be simplified even more. Compensator 418, FIG. 6C, further eliminates $C_f$ from the PID circuit of FIG. 6A, providing the simple transfer function of:

$$K_p \qquad 5$$

It should be apparent, however, that the more the compensator is simplified, the fewer disturbances are rejected and thus the more the performance of the active tremor control system is affected.

Figure 7:
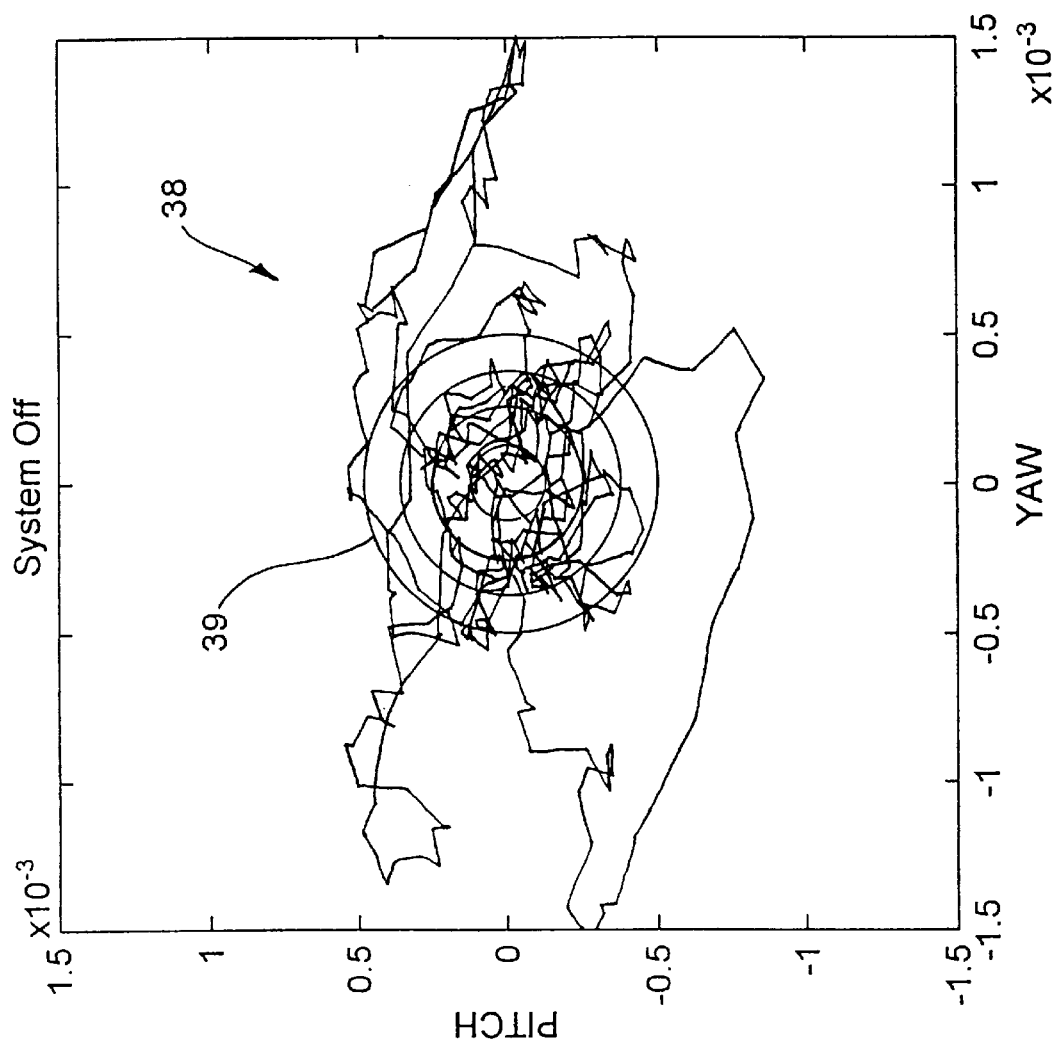
FIG. 7 is a pitch versus yaw plot of the meandering experienced at a point of aim without the tremor control system activated.

The normal tremor experienced without the tremor control system of the present invention is demonstrated by plot 38, FIG. 7, which represents the meandering point of aim of a rifle on a target 39 by an unsupported marksman for a period of ten seconds. Plot 38 shows the effect in both pitch and yaw of tremor on the marksman's accuracy.

Figure 8:
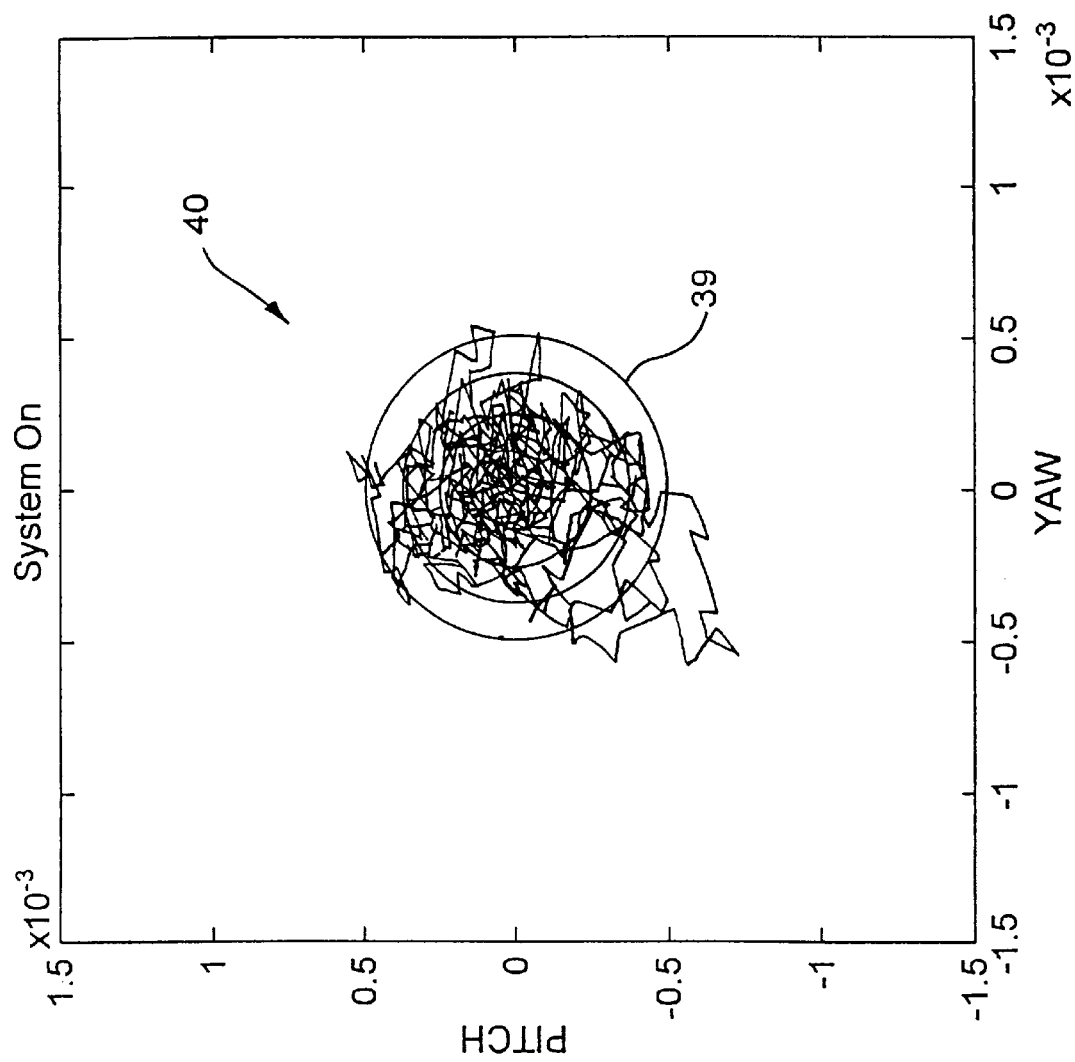
FIG. 8 is a pitch versus yaw plot, similar to FIG. 7, at the same point of aim with the tremor control system activated.

In contrast, once the tremor control system of the present invention is activated, the marksman's accuracy is dramatically improved as demonstrated by plot 40, FIG. 8 which represents ten seconds of data with the system activated. As plot 40 demonstrates, the point of aim of the unsupported marksman is nearly completely restricted within the target 39 and is concentrated primarily at the center of target 39.

Figure 9A:
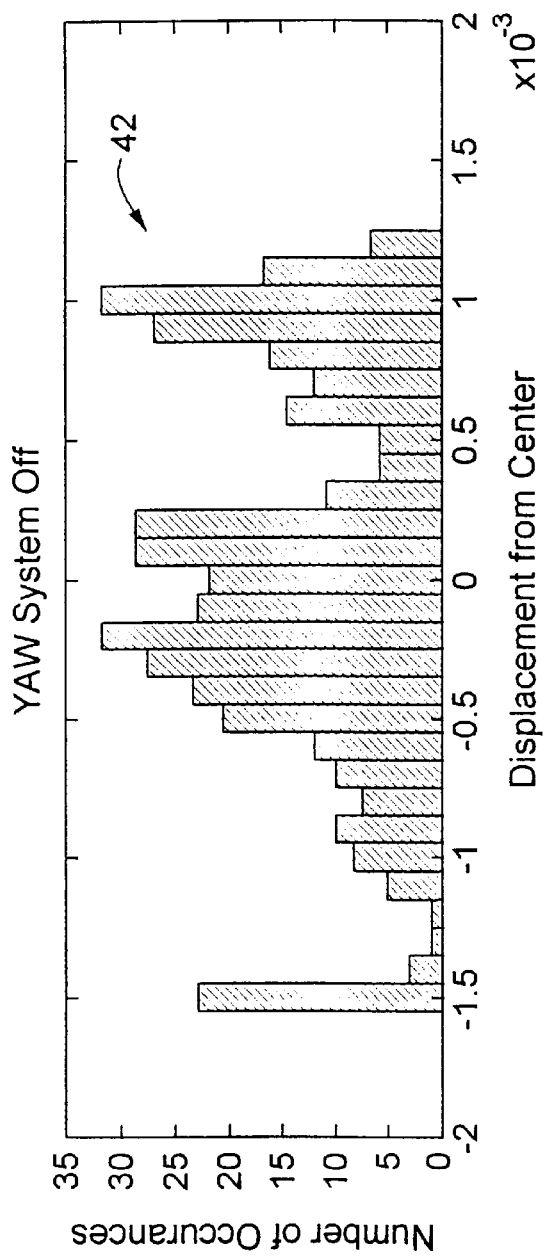
FIG. 9A is a histogram of the frequency density versus displacement of the uncorrected yaw of FIG. 7.
Figure 9B:
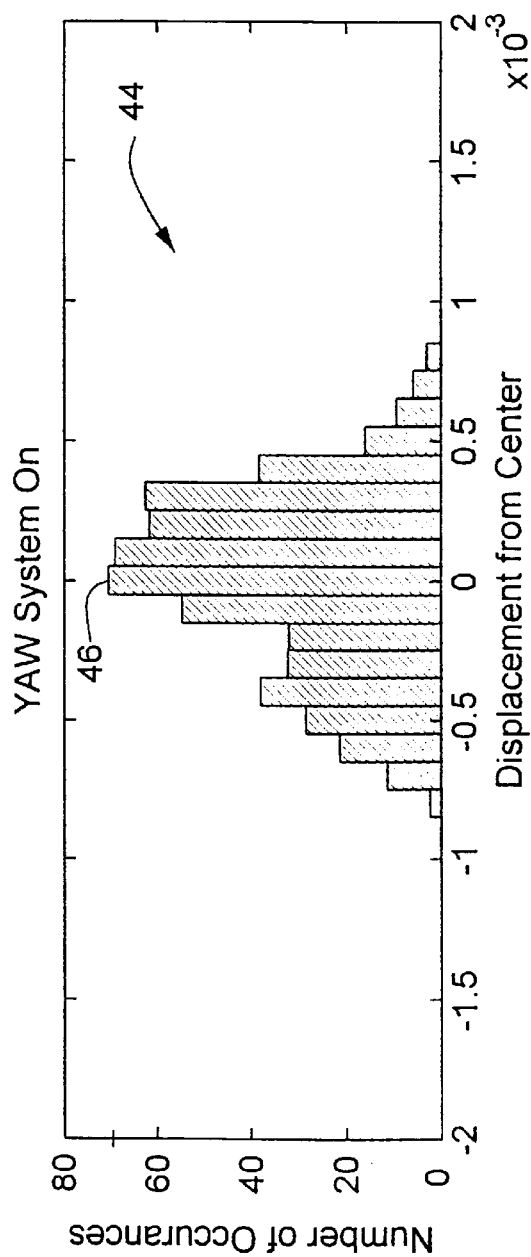
FIG. 9B is a histogram, similar to FIG. 9A, of the frequency density versus displacement of the corrected yaw of FIG. 8.

A comparison of the frequency density of the uncorrected yaw and the corrected yaw is demonstrated by histogram 42, FIG. 9A, which represents the frequency density of the uncorrected yaw of FIG. 7, and histogram 44, FIG. 9B, which represents the frequency density of the corrected yaw of FIG. 8. Histogram 42 represents the number of occurrences of the point of aim at given displacement, in radians, from the target center without the tremor control system activated. In contrast, histogram 44 represents the number of occurrences of the point of aim at a given displacement from the target center with the system activated. It can be seen the not only does the displacement from center significantly decrease, but the frequency with which the point of aim maintains center, i.e., zero displacement, increases from approximately 22 to 75. This is an improvement of 340%. Indeed, the zero displacement density, i.e. dead center, has the greatest density as demonstrated by peak 46.

Figure 10A:
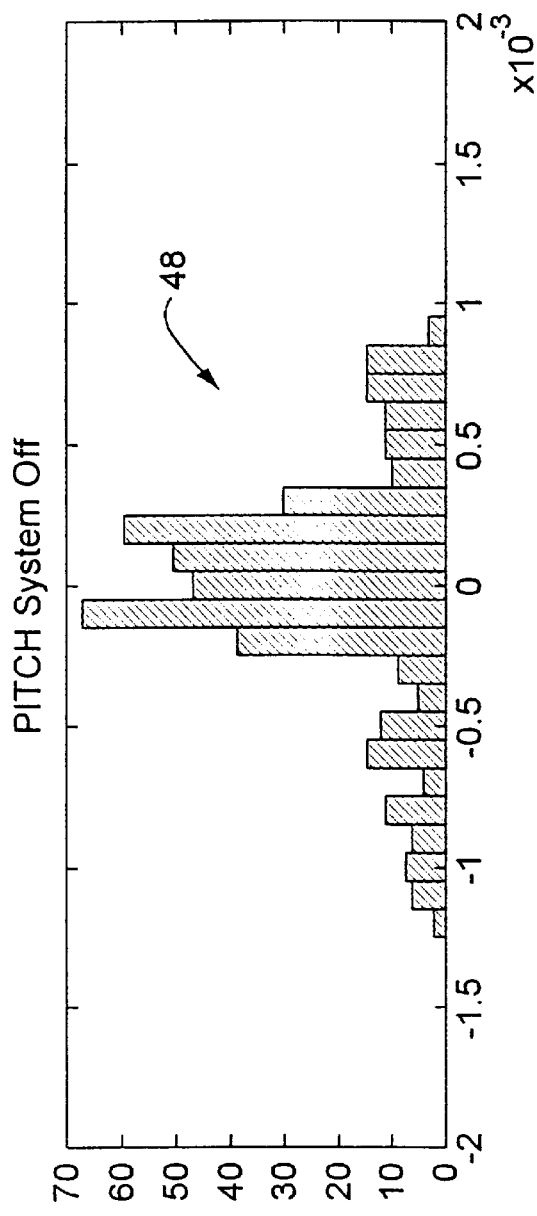
FIG. 10A is a histogram, similar to FIG. 9A, of the frequency density versus displacement of the uncorrected pitch of FIG 7.
Figure 10B:
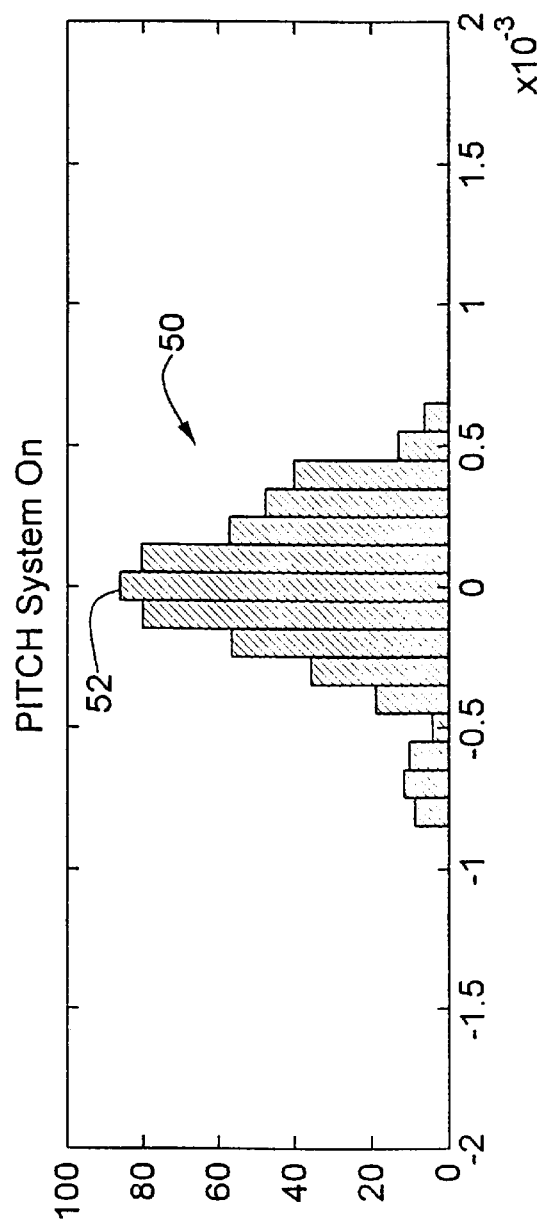
FIG. 10B is a histogram, similar to FIG. 9B, of the frequency density versus displacement of the corrected pitch of FIG. 7.

Similarly, the uncorrected pitch frequency density is demonstrated by histogram 48, FIG. 10A, which represents the uncorrected pitch of FIG. 7, while histogram 50, FIG. 10B, represents the corrected pitch of FIG. 8. Again, as with yaw discussed above, the displacement from center is significantly reduced, nearly 50%. Moreover, peak 52 of histogram 50 demonstrates that the frequency of the point of aim having zero displacement from center, dead center, is maximized.

Thus, the histograms of FIGS. 9A, 9B, 10A and 10B demonstrate that with the tremor control system of the present invention, not only is displacement from the center of target 39 reduced, but the point of aim at dead center of target 39 is maximized.

Incorporation of the active tremor control system of the present invention into a rifle may be accomplished in a number of ways using a variety of different types of actuators, inertial sensors, and inertial masses, as will be readily apparent to one skilled in the art.

Figure 11:
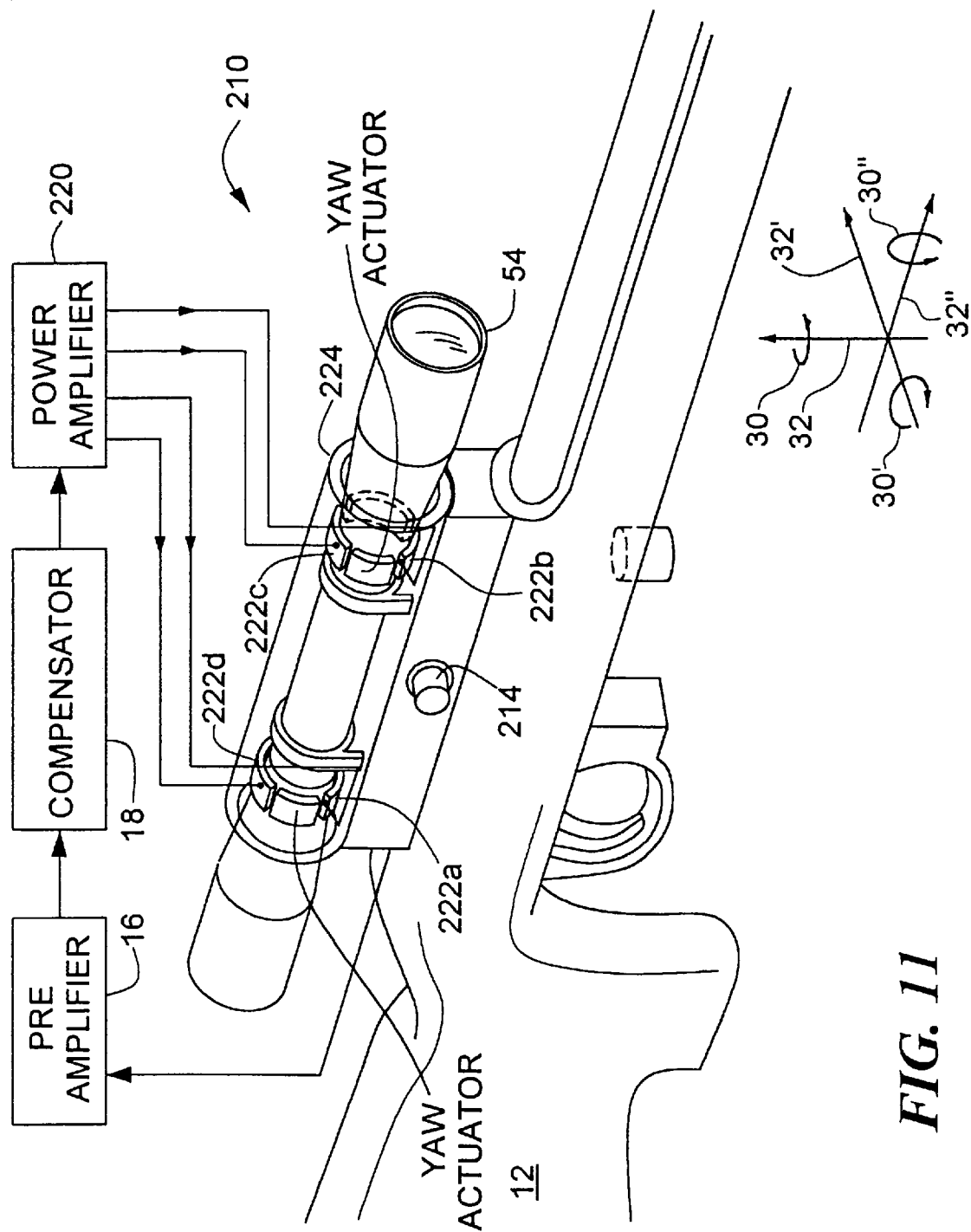
FIG. 11 is a three-dimensional diagram of a tremor control system mounted on a rifle in which the inertial mass includes a tube and the actuators include piezoelectric elements.

Active tremor control system 210, FIG. 11, includes sensor 214, for example a gyroscopic sensor as discussed above. However, rather than two independent masses, inertial mass 224 may be a metal tube which cancels perturbations in both pitch and yaw. Actuators 222a–d include, for example, piezoelectric elements, which cancel variations in pitch in response to the reaction signal generated by compensator 18 and amplified by power amplifier 220, expand or contract in a push-pull arrangement thereby applying the appropriate torque to tubular mass 224 to cancel perturbations due to tremor induced in rifle 12. Actuators 222a–d may, however, also include torque motors which still operate in a push-pull arrangement.

Figure 12:
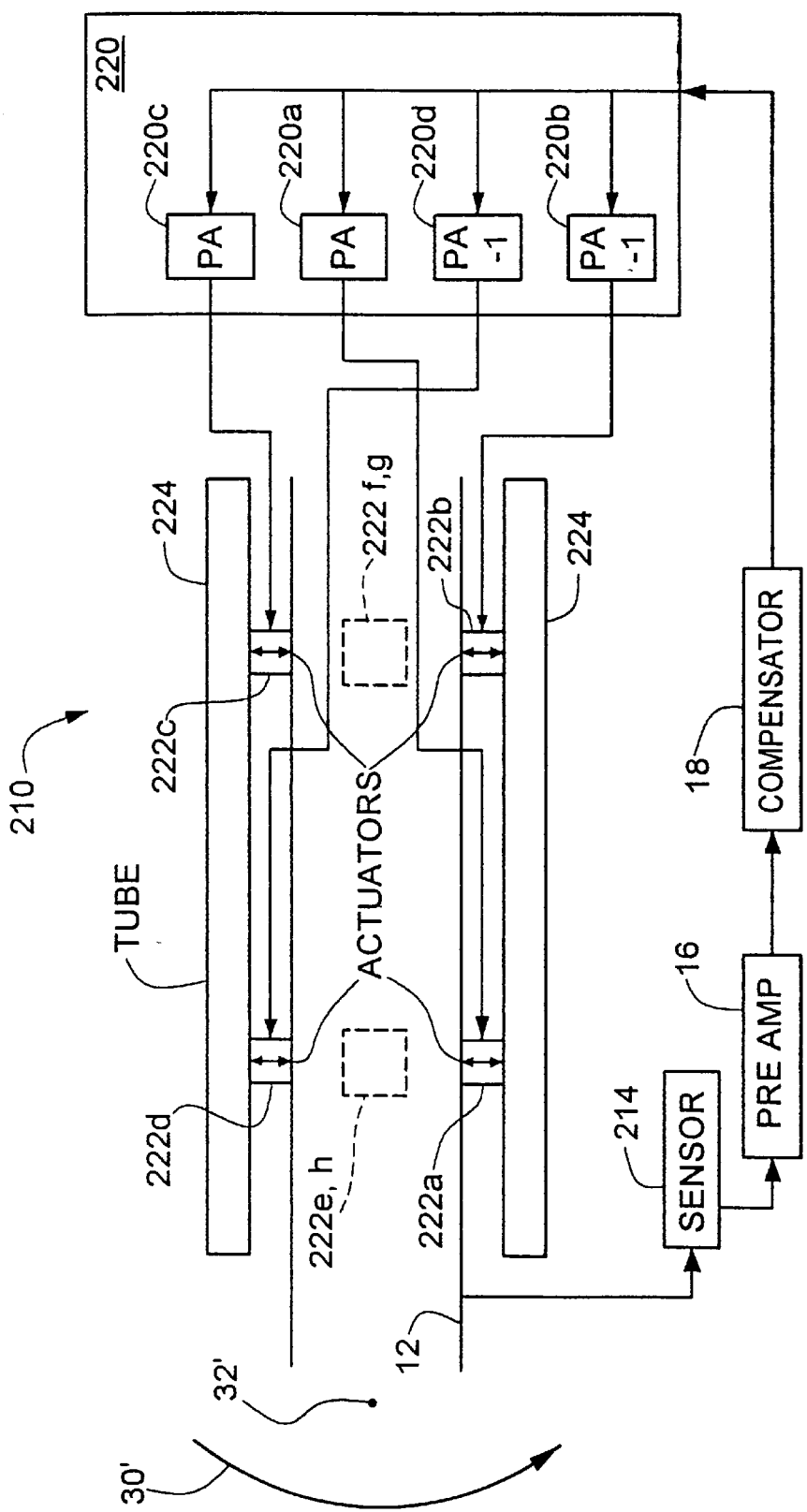
FIG. 12 is a schematic diagram of the tremor control system of FIG. 11.

Gyroscopic inertial sensor 214, FIG. 12, detects angular motion 30' applied to rifle 12 about axis 32'. Actuators 222a–d are coupled to rifle 12 via scope 54, FIG. 12. However, because scope 54 is rigidly fixed to rifle 12, motion of rifle 12 translates into motion of scope 54. Thus actuators 222a–d are coupled to rifle 12 via scope 54.

Pre-amplifier 16 conditions the signal from inertial sensor 214. The conditioned signal is manipulated by compensator 18, which may be a LAG or PID compensator as discussed above, to generate the reaction signal to be amplified by power amplifier 220. Power amplifier 220 includes positive power amplifiers 220a and 220c, and negative power amplifiers 220b and 220c. Power amplifiers 220a–d drive, respectively, actuators 222a–d.

Actuators 222a–d operate in differential pairs. Thus, as actuators 222a and 222c expand, corresponding actuators 222b and 222d contract, thereby applying a torque to rifle 12 equal and opposite to the sensed torque 30' and simultaneously applying a reactive torque to tubular mass 224 in order to "push" on mass 224 and successfully cancel angular motion 30' sensed about axis 32'.

As will be understood by those skilled in the art, perturbations that affect yaw are similarly cancelled with the addition of piezoelectric actuators 222e–h, shown in phantom, coupled to tubular mass 224 and to rifle 12 along with corresponding circuitry.

Figure 13:
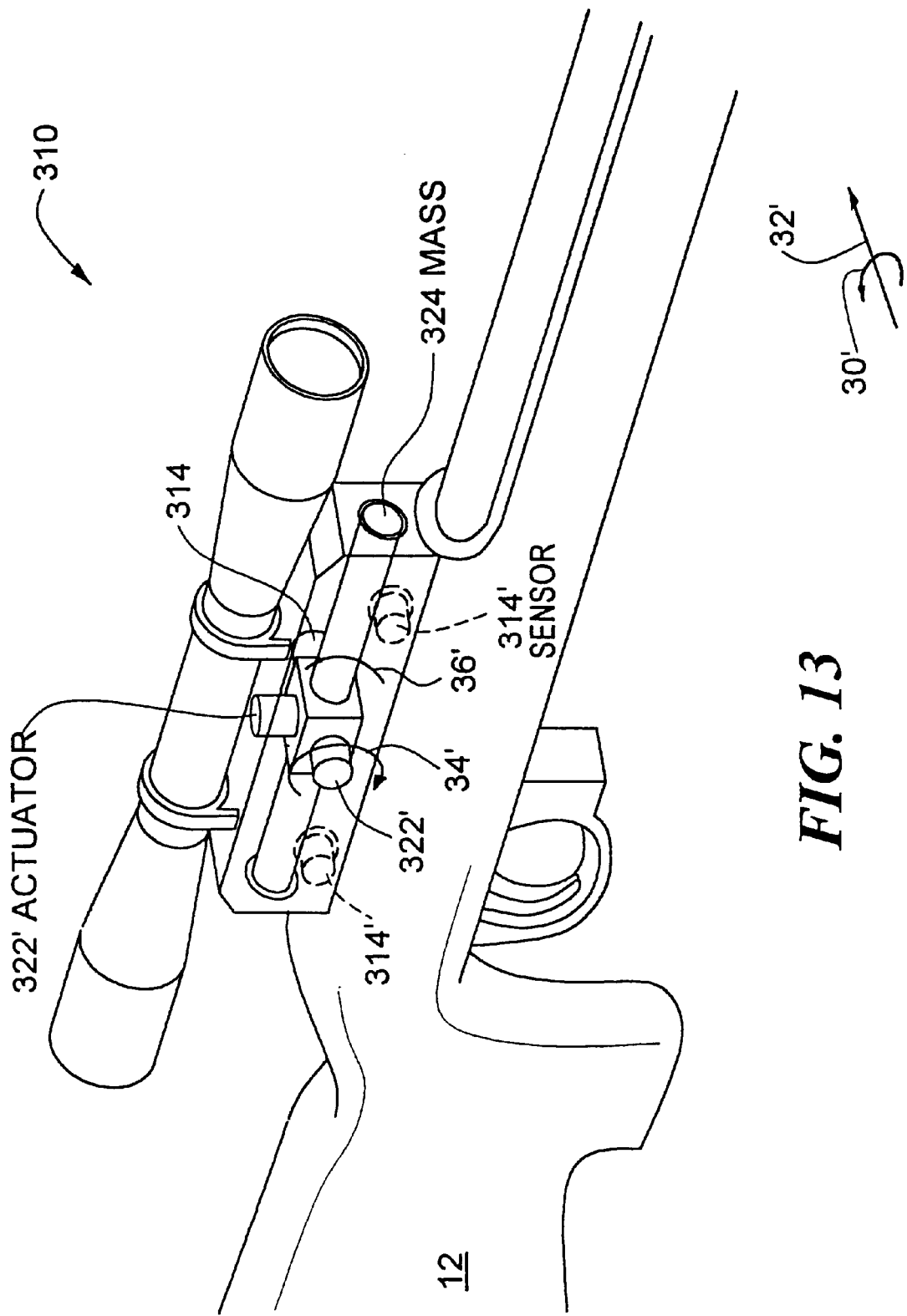
FIG. 13 is a three-dimensional view of a tremor control system mounted on a rifle in which the inertial mass includes a single rod to correct both pitch and yaw.

Another embodiment of the active tremor control system of the present invention is shown in FIG. 13 in which inertial mass 324 includes a single rod. Inertial sensor 314 may be a gyroscopic sensor, or two accelerometers 314', shown in phantom, spaced a distance apart to provide a differential signal representing angular motion 30' about axis 32'.

The perturbation is detected, conditioned, manipulated and amplified to produce a reaction signal as discussed above. The reaction signal drives actuator 322, which may be a rotational electric motor or a piezoelectric torque motor, to apply torque 34' to rifle 12 and reactive torque 36' to rod 324 to cancel angular motion 30' as previously discussed. Again, as will be readily apparent to those skilled in the art, perturbations in yaw and roll may similarly be cancelled with additional sensors and actuators placed in the appropriate planes of motion.

Figure 14:
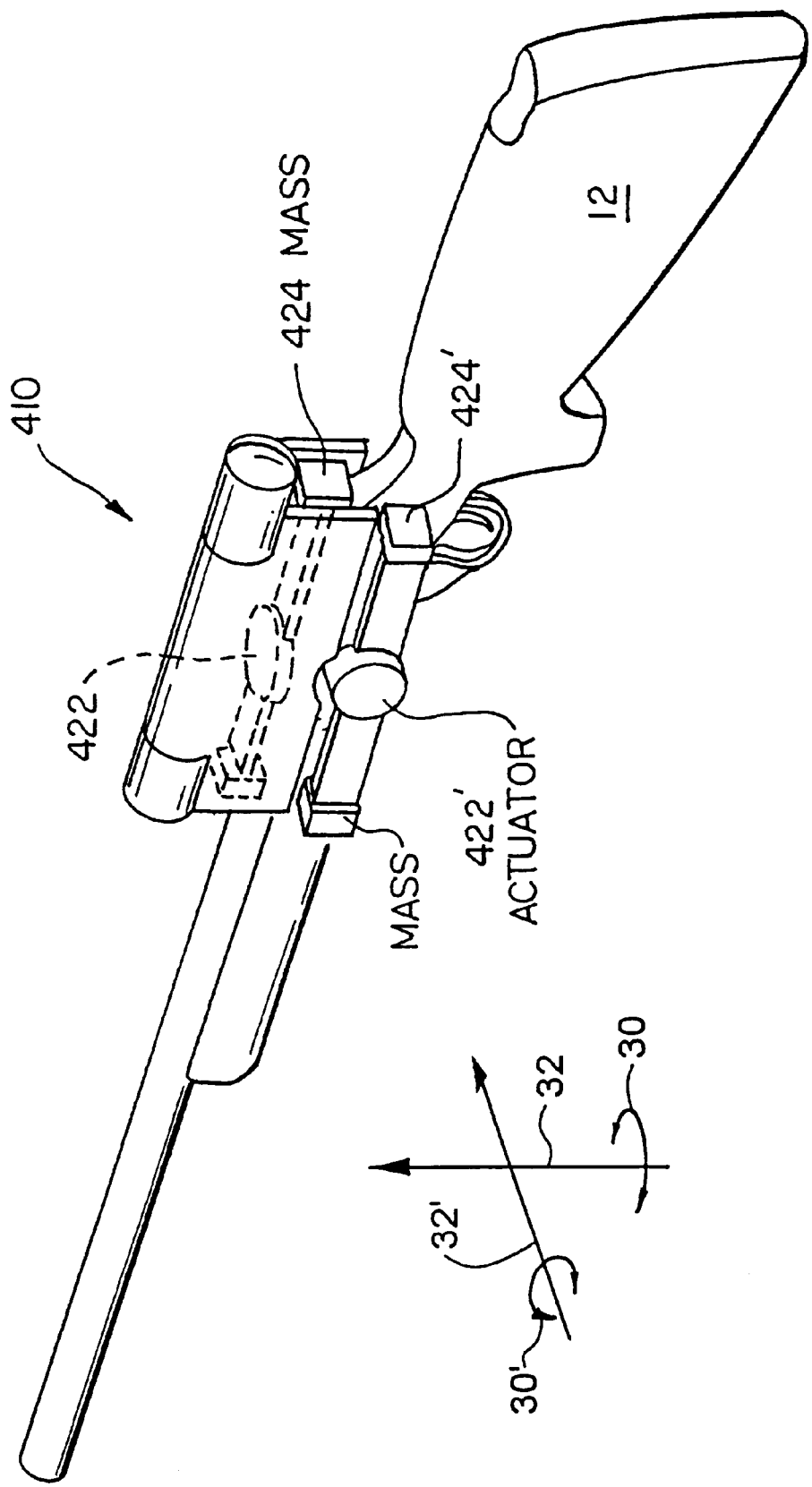
FIG. 14 is a three-dimensional view of a tremor control system mounted on a rifle in which the inertial mass includes a bar for correcting pitch and a bar for correcting yaw and the actuators include torque motors.

Yet another embodiment of the active tremor control system of the present invention is shown in FIG. 14 where active tremor control system 410 includes a first inertial bar mass 424' and actuator 422', which may be, for example, a torque motor, for cancelling angular motion 30' about axis 32', e.g. pitch. There is also provided bar mass 424 and actuator 422, shown in phantom, which cancel angular motion 30 about axis 32.

Figure 15:
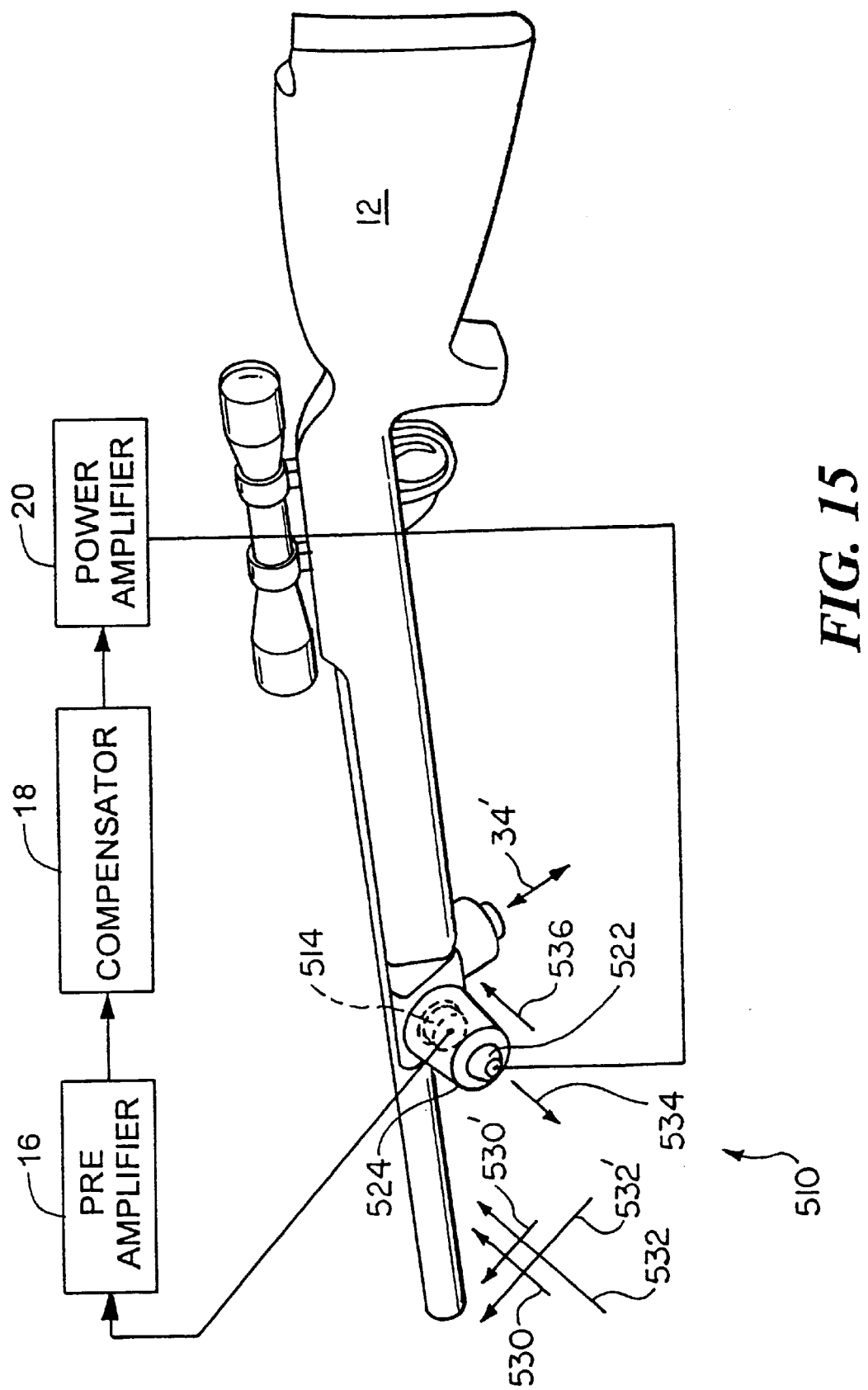
FIG. 15 is a three-dimensional view of a tremor control system mounted on a rifle in which the inertial mass includes a tubular sleeve and the actuator includes a linear motor mounted within the sleeve.

Still another embodiment is demonstrated by tremor control system 510, FIG. 15, which effectively acts as a bi-pod. Sensor 514 senses linear motion 530 along axis 532. In response, the signal representing the sensed motion is conditioned, manipulated, and amplified as discussed above. The reaction signal drives actuator 522, for example a Model F3 Shaker linear motor available from Wilcoxon Research, Inc., Rockville, Md., which simultaneously generates applied force 534, applied to rifle 12, and reaction force 536, applied to mass 524, allowing actuators 522 to "push" against mass 524 to cancel motion 530.

While the above description has been directed to incorporating the active tremor control system into a rifle, the system may also be incorporated into other hand held devices.

Figure 16:
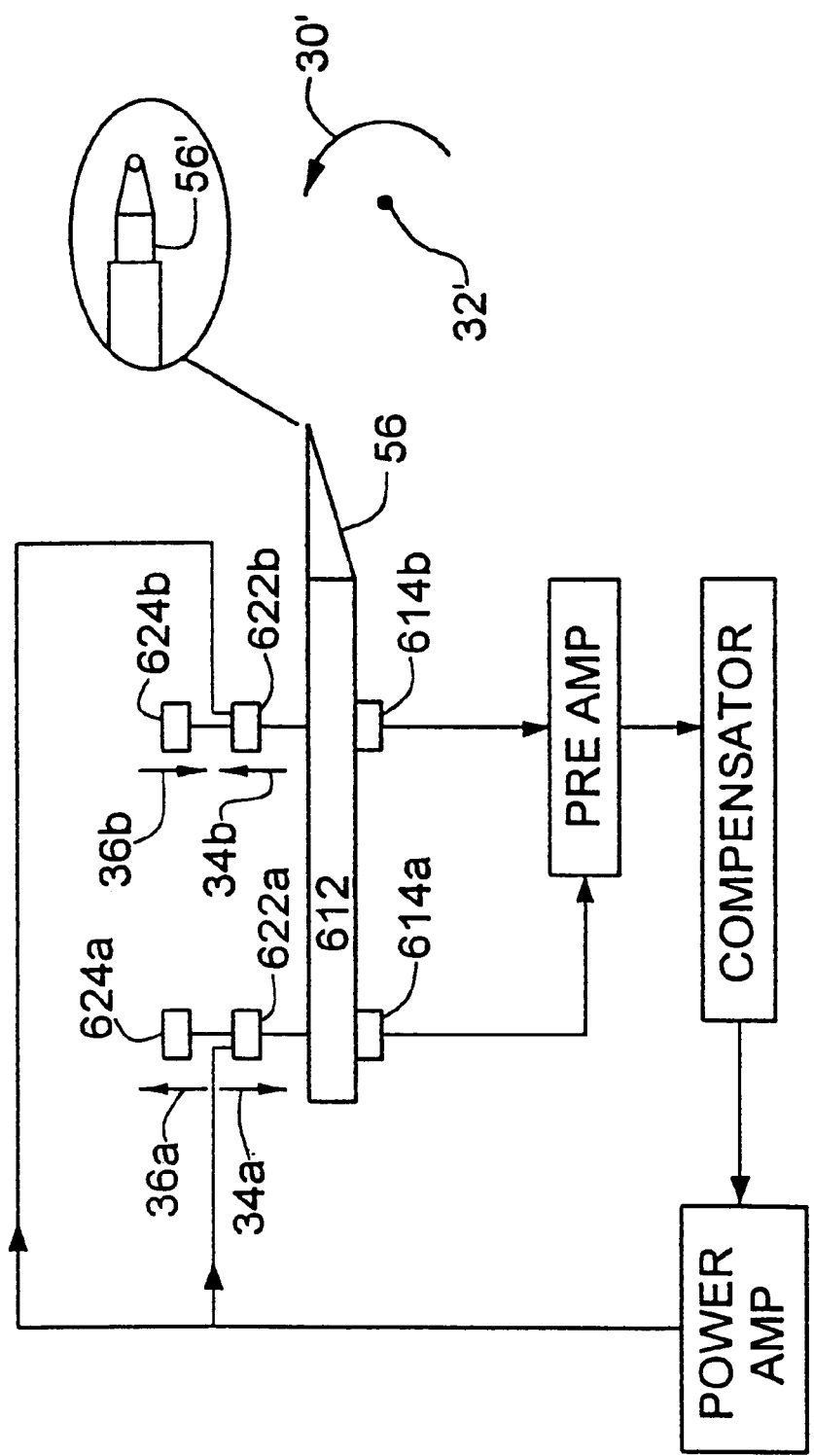
FIG. 16 is a schematic block diagram of a tremor control system mounted on a surgeon's scalpel.

Scalpel 612, FIG. 16, having blade 56 includes sensors 614a and 614b, which may be accelerometers spaced a distance apart to generate a differential signal representative of rotation 30 about axis 32, shown projecting into the drawing. In a manner similar to that of FIG. 12, a push-pull mechanism is used to cancel angular motion 30' about axis 32'.

Thus, in order to cancel angular motion 30', actuator 622a, for example a piezoelectric, generates force 34a applied to scalpel 612 to push scalpel 612 while actuator 622b generates force 34b to pull scalpel 612. Simultaneously, actuator 622a applies reactive torque 36a to mass 624a and actuator 622b applies reactive torque 36b to mass 624b. Thus, angular motion 30' is cancelled.

This is not a necessary limitation of the invention, however, as actuators 622a and 622b may be arranged on opposite sides of scalpel 612 to provide a push-push/pull-pull mechanism. Moreover, blade 56 may easily be replaced with pen 56' to allow patients suffering from mild Parkinson's disease to write in a legible fashion.

The above embodiment has been described in terms of canceling motion about only one axis for simplicity. However perturbations in yaw and roll are canceled in the same manner with additional actuators and sensors in the respective planes of the motion.

Figure 17:
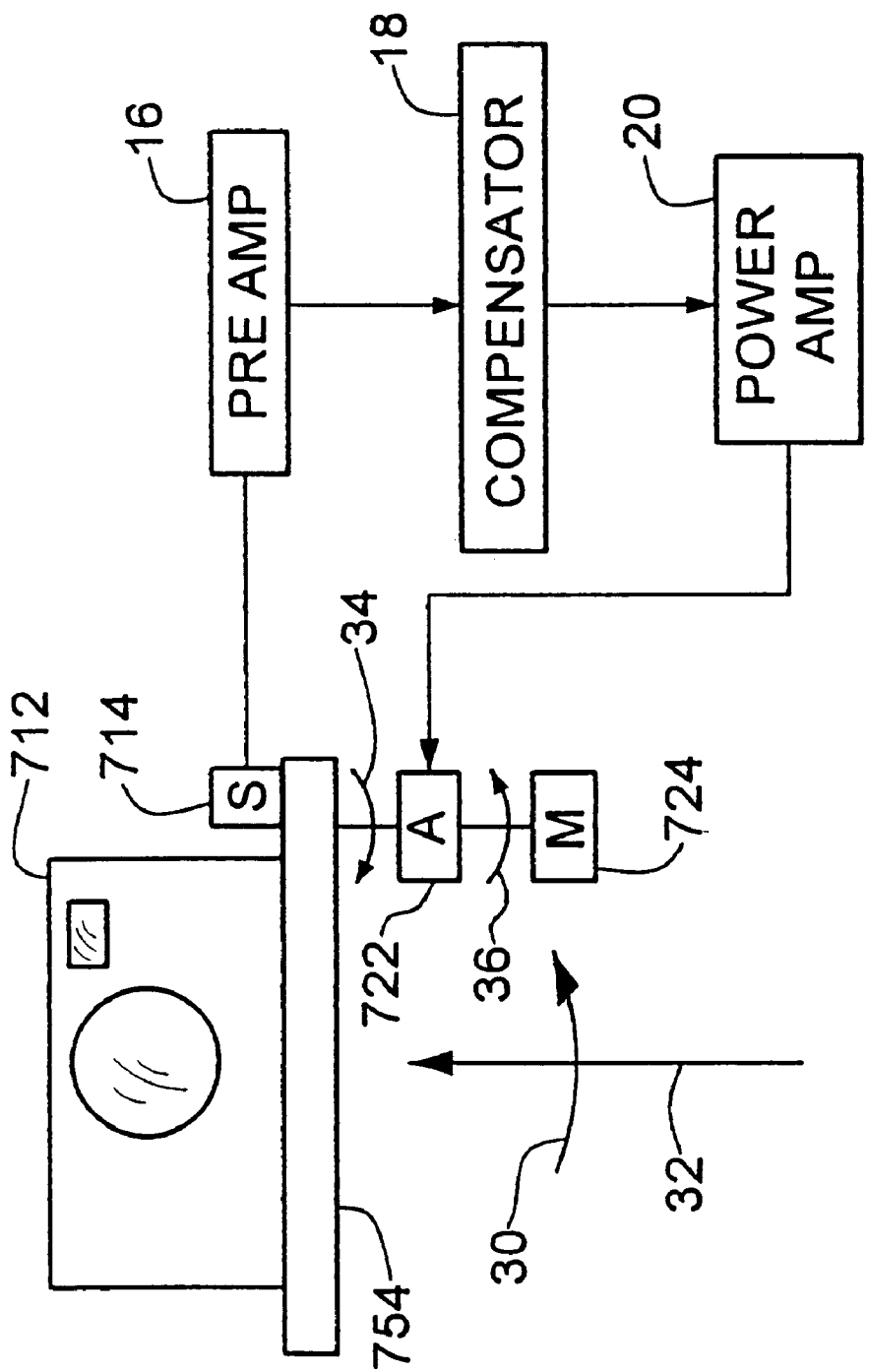
FIG. 17 is a schematic block diagram of a tremor control system mounted on a camera.

The tremor control system of the present invention may similarly be incorporated into photography and video equipment. Camera 712, FIG. 17, may be a still or video camera and may include base 754 coupled to actuator 722. Sensor 714 senses motion about axis 32. Pre-amplifier 16 conditions the signal from sensor 714 and compensator 18 generates the reaction signal which, after being amplified by power amplifier 720, drives actuator 722 to concurrently generate torque 34 applied to camera 712 and reaction torque 36 applied to mass 724, thereby cancelling angular motion 30 about axis 32. Again, for simplicity cancellation of pitch will not be repeated, as it will be apparent to one skilled in the art readily that cancellation of pitch and roll are accomplished in the same manner in the respective planes of motion.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An active tremor control system for stabilizing against alternating perturbations comprising:

an inertial sensor for sensing angular motion about a first axis of an object induced by alternating perturbations;

an inertial mass independent of the object; and an actuator coupled to the object and the mass and responsive to the inertial sensor for selectively applying a torque to the object representative of the sensed angular motion such that the angular motion about the first axis induced by the perturbation is cancelled, said actuator concurrently applying a reactive torque, equal and opposite to the applied torque, to the mass.

2. The active tremor control system of claim 1 in which the inertial sensor includes a rate gyroscope for measuring the angular rotation about said axis.

3. The active tremor control system of claim 2 in which the inertial mass is a wheel.

4. The active tremor control system of claim 3 in which the actuator includes a rotational motor.

5. The active tremor control system of claim 1 in which the inertial sensor includes an accelerometer.

6. The active tremor control system of claim 5 in which said accelerometer is an angular accelerometer.

7. The active tremor control system of claim 1 in which the inertial mass is a rod.

8. The active tremor control system of claim 7 in which the actuator is a torque motor.

9. The active tremor control system of claim 1 in which the inertial mass is a tube.

10. The active tremor control system of claim 9 in which the actuator is a piezoelectric device.

11. The active tremor control system of claim 9 in which the actuator is a linear motor.

12. The active tremor control system of claim 1 further including a second inertial sensor for sensing angular motion about a second axis of the object due to the alternating perturbations; and a second actuator, coupled to the object and the mass and responsive to the second inertial sensor for selectively applying a torque to the object representative of the sensed angular motion such that the angular motion about the second axis induced by the perturbation is cancelled, the second actuator concurrently applying a reactive torque equal and opposite to the applied torque to the mass.

13. The active tremor control system of claim 12 in which the object is a firearm.

14. The active tremor control system of claim 12 in which the object is is a camera.

15. The active tremor control system of claim 12 in which the object is a scalpel.

16. The active tremor control system of claim 12 in which the object is a writing implement.

17. An active tremor control system for stabilizing an object against alternating perturbations comprising:

a first inertial sensor for sensing angular motion about a first axis of an object due to alternating perturbations;

a second inertial sensor for sensing angular motion about a second axis of the object due the prolonged alternating perturbations;

a first inertial mass;

a second inertial mass;

a first actuator coupled to the object and the first inertial mass and responsive to the first inertial sensor for selectively applying a first torque to the object representative of the sensed angular motion about said first axis, said first actuator concurrently applying a first reactive torque, in response to the first applied torque, to the first inertial mass equal and opposite to the first applied torque such that the angular motion about the first axis is cancelled; and a second actuator coupled to the object and the second inertial mass and responsive to the second inertial sensor for selectively applying a second torque to the object representative of the sensed angular motion about said second axis, said second actuator concurrently applying a second reactive torque, in response to the second applied torque, to the second inertial mass equal and opposite to the second applied torque such that the angular motion about the second axis is cancelled.

\* \* \* \* \*